United States Patent
Miura et al.

[11] Patent Number: 5,191,720
[45] Date of Patent: Mar. 9, 1993

[54] SPOT WELDING INSPECTING APPARATUS

[76] Inventors: Yoshimi Miura, 5-16, Itsukaichi 2-chome, Saeki-ku, Hiroshima-shi, Hiroshima-ken 731-51, Japan; Masaaki Miura, 12-35, Miyauchi 1-chome, Hatsukaichi-shi, Hiroshima-ken 738, Japan

[21] Appl. No.: 771,320

[22] Filed: Oct. 2, 1991

[30] Foreign Application Priority Data

Oct. 3, 1990 [JP] Japan .................................. 2-267107
Feb. 3, 1991 [JP] Japan .................................. 3-35673

[51] Int. Cl.$^5$ .............................................. G01B 5/00
[52] U.S. Cl. ................................. 33/785; 33/783; 33/501; 33/555.2; 33/DIG. 2
[58] Field of Search ................. 33/783, 785, 806, 810, 33/811, 812, 795, 501, 555.1, 555.2, 555.3, 557, 560, DIG. 2

[56] References Cited
U.S. PATENT DOCUMENTS 2,308,946  1/1943  Wagner ...................... 33/560
2,828,546  4/1958  Campbell .................. 33/560

FOREIGN PATENT DOCUMENTS

948818  9/1956  Fed. Rep. of Germany ........ 33/783

Primary Examiner—William A. Cuchlinski, Jr.
Assistant Examiner—Alvin Wirthlin
Attorney, Agent, or Firm—Flynn, Thiel, Boutell & Tanis

[57] ABSTRACT

The present invention relates to a spot welding inspecting apparatus for inspecting a weld between two metal plates which are subjected to spot welding without destroying the metal plates or weld. A pair of knife gauges having an interval therebetween larger than the diameter of the weld are inserted between the welded metal plates by a continuous impact of the hammer which is driven by a compressed air and pushed between the metal plates so as to clamp the weld. Thereafter, the piston is moved so that the knife gauges may approach the weld to indicate the distance between the knife gauges with the index.

5 Claims, 7 Drawing Sheets

SPOT WELDING INSPECTING APPARATUS

BACKGROUND OF THE INVENTION

Field of the Invention

The present invention relates to a spot welding inspecting apparatus for measuring the diameter of a weld between two metal plates and inspecting the welding state of the work. There has been conventionally employed such a means for inspecting the welding state of the work in which a thick chisel is driven between the gap of the two metal plates so as to see whether the weld is removed therefrom or not. However, it had a problem that it required a skillful technique. There has also been a technique in which the work which has been subjected to welding is destroyed and the welded portion is directly inspected. The problem is that the inspected samples are destroyed.

In view of the problems of the conventional inspection means, it is desired to provide a spot welding inspecting means capable of being handled by an unskilled operator with ease, of being processed within a short period of time with high accuracy and of inspecting the welding state without destroying the welded work.

SUMMARY OF THE INVENTION

It is an object of the present invention to provide a spot welding inspecting apparatus for inspecting a weld between two metal plates which were subjected to spot welding.

According to the present invention, a pair of knife gauges are inserted between the pair of metal plates which were subjected to spot welding while continuous impact is given to the knife gauges so as to reach the position where the weld is clamped by the pair of knife gauges. Successively, the pair of knife gauges are forced to approach the weld whereby the welding state can be measured by the interval between the pair of knife gauges.

Driving of a chisel can be made by dexterity of the operator which involves much time for inspecting thereof and skillful technique for handling thereof. However, according to the present invention, the inspecting of the welding portion can be made with ease even by an unskilled operator.

The above and other objects, features and advantages of the present invention will become more apparent from the following description taken in conjunction with the accompanying drawings.

PREFERRED EMBODIMENT OF THE PRESENT INVENTION

A spot welding inspecting apparatus according to a preferred embodiment of the present invention will be described with reference to FIGS. 1 to 12.

Designated at 3 is a front portion of the spot welding inspection apparatus (hereinafter referred to as simply apparatus) and 4 is a rear portion of the apparatus. A casing 5 is comprised of a cylinder 30 and a front cover 10. A front cover 10 comprises a frustoconical front portion 11 and a cylindrical rear portion 12. The frustoconical front portion 11 has an oblong opening 13 at the front end thereof and an inner stepped portions 15 forming an oblong groove 14 having an enlarged width in a direction transverse to the oblong opening 13. The inner stepped portion 15 has a rear surface extending to the middle of the cylindrical rear portion 12. The short sides of the oblong groove 14 have tapered surfaces 16 so as to be narrowed toward the front portion thereof and are arranged in parallel with center line M—M at the rear portion thereof.

A pair of knife gauges 20 and 20 can be inserted into the oblong opening 13 and the oblong groove 14. Each knife gauge 20 has a knife portion 22 for penetrating the oblong opening 13 and a boss portion 21 to be engaged in the oblong groove 14. Each knife gauge 20 also has an annular notched portion 27 which receives with an end portion of a coil spring 26 when a guide pin 24 is inserted into the symmetrically arranged knife gauges 20 and 20 at both sides of the guide pin 24 with the compressed spring coil 26 disposed between the knife gauges 20 and 20. The boss portion 21 is inclined at the front surface 9 thereof so as to contact the tapered surfaces 16 provided at the inner side of the frustoconical front portion 11 when the knife gauges 20 and 20 are inserted into the front cover 10. Knife portions 22 and 22 protrude from the front ends of the boss portions 21 and 21 and the confronting surfaces thereof are linear. The front surfaces 30,30 of the boss portions 21 and 21 move toward and away from each other when they move along the tapered portions 16. The rear ends of the knife gauges 20 protrude rearwardly from the inner stepped portions 15 even when the knife gauges 20 are in their most advanced positions.

A cylinder 30 is coaxially slidably received into the front cover 10 and the length of the engagement therebetween is adjustable by a means, described later. A valve case 40 is fixedly engaged inside the front portion of the cylinder 30 and defines an annular projection 41 at the inner surface front portion thereof. An air communication path 42 is formed between a rear end of the valve case 40 and an inner surface rear portion of the annular projection 41. The air communication path 42 communicates with an air introduction port 31 opened at the front side portion of the cylinder 30.

The hammer 50 strikes the patch 53 which bears against the rear end surfaces of the knife guages 20 and 20. The hammer 50 is slidably engaged in the valve case 40 and a compression spring 54 is interposed between the patch 53 and the valve case 40. The hammer 50 comprises a forehead portion 51 slidably contacting the annular projection 41 of the valve case 40 and a large diameter portion 52 sliding on the inner surface of the valve case 40 behind the annular projection 41. An airflow path 55 is defined between the side surface of the forehead portion 51 and a rear end surface of the large diameter portion 52. The compression spring 54 encircles with the outer periphery of the forehead portion 51 and said spring is interposed in compression between the annular projection 41 and the patch 53.

A hollow plunger 60 is provided to push the hammer 50 and said plunger has an opening at the rear end surface thereof. The plunger 60 comprises a front cylindrical portion 61 and a collar portion 62. The front cylindrical portion 61 is slidably engaged in the rear portion of the valve case 40 and the collar portion 62 is slidably engaged in the cylinder 30. A compression spring 64 is interposed between the rear end edge of the valve case 40 and the front surface of the collar 62. An annular stopper portion 33 is defined at the rear portion of the air introduction port 31 of the cylinder 30 for preventing the plunger 60 from moving farther forwardly.

A piston 70 is slidably engaged in the cylinder 30 behind the rear portion of the plunger 60 and slidably inserted into a slidable hole 35 defined in a partition wall 34 of the cylinder 30. The piston 70 comprises a rod portion 71 adapted to be pushed inside the central hole 63 of the plunger 60 and a piston portion 72 slidably contacting the internal wall of cylinder 30. Oil 66 is sealed in the central hole 63 of the plunger 60.

A rear cover 80 covers a rear end surface of the cylinder 30 and has an air supply port 81 for supplying air into the air communication path 32 defined along the cylinder 30 so as to communicate with the air introduction port 31 provided at the side surface of the cylinder 30 and a rear end surface of the piston 70. The rear cover 80 also has an air supply port 82 for supplying air into the upper end of the cylinder 30 above the piston 70.

An air switching rotary valve 90 is attached to the rear surface of rear cover 80 by a central axle 92. A packing 93 is provided between the valve 90 and the rear cover 80. An air hose connection port 91 is provided for selectively allowing the air supply ports 81 and 82 to communicate with each other by switching the rotary valve 90.

A pin driver 17 is attached to the portion which is positioned at an outer surface of a rear portion of the front cover 10 and corresponds to the portion where the valve case 40 is engaged in the front portion of the cylinder 30. A pin 19 is biased by a coil spring 18 toward holes 43 and 44 whereby the length of the engagement between the front cover 10 and the cylinder 30 can be adjusted.

An operation of the spot welding inspecting apparatus will be described hereinafter.

Figure 1:
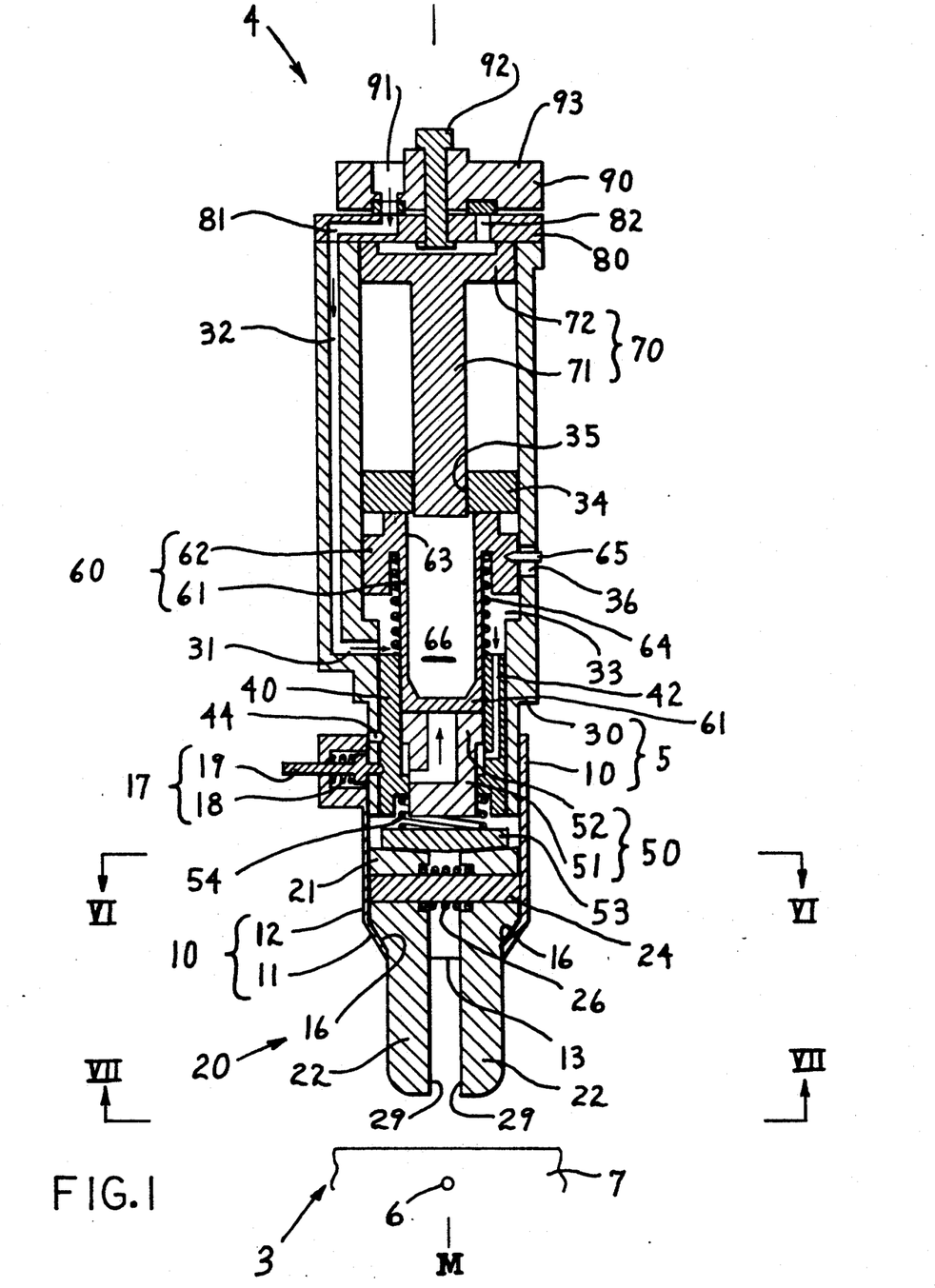
FIG. 1 is a vertical cross sectional front view showing a state where a hammer is retracted.
Figure 2:
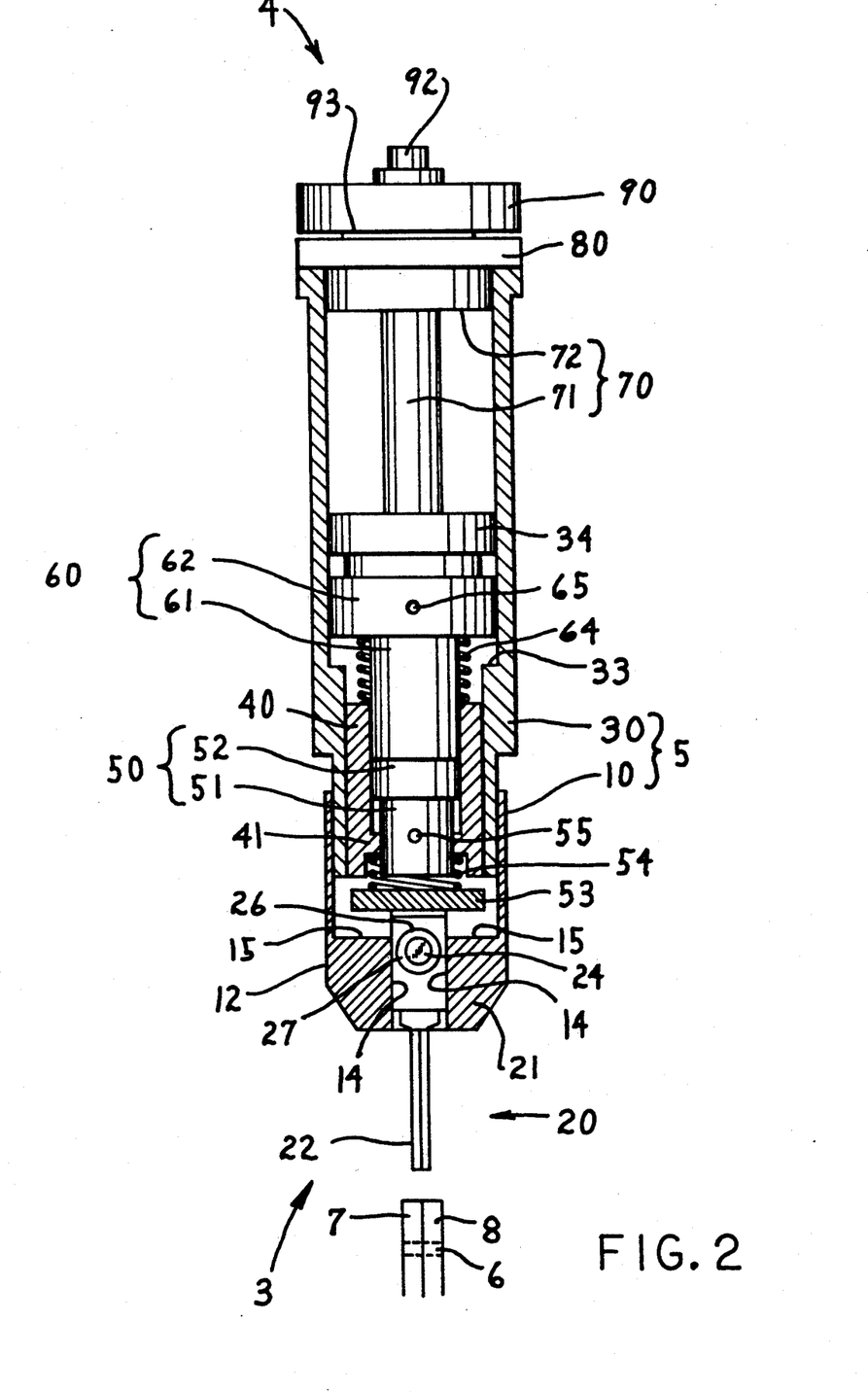
FIG. 2 is a vertical cross sectional side elevation of FIG. 1.

Firstly, the pin 19 is released by the pin driver 17 so that the front cover 10 can be shallow inserted onto the cylinder 30 and thereafter it is inserted into the hole 43 so that the front cover is fixedly engaged into the cylinder 30 as illustrated in FIGS. 1 and 2.

Secondly, knife portions 22 and 22 are inserted into the gap around the weld 6 defined between the two metal plates 7 and 8 as illustrated in FIGS. 1 and 2.

Thirdly, an air hose connected to a compressed air source, not shown, is connected to the air hose connection port 91 of the air switching rotary valve 90 so that the air supply port 81 for supplying air to the valve case 40 is set to be ready for receiving the air. Then, the air is introduced into the air communication path 32 of the cylinder 30 and the air introduction port 31 so that the valve case 40 is set to be retracted as shown in FIG. 1. The air introduced into the air introduction port 31 further flows to the airflow path 55 of the hammer 50 through the air communication path 42 of the valve case 40 whereby the compressed air enters the gap defined between the rear end surface of the hammer 50 and the front end surface of the plunger 60. As a result, the pressure difference is generated between the front end and the rear end surfaces of the hammer 50 so that the hammmer 50 is pushed forward to apply an impact on the patch 53.

Figure 3:
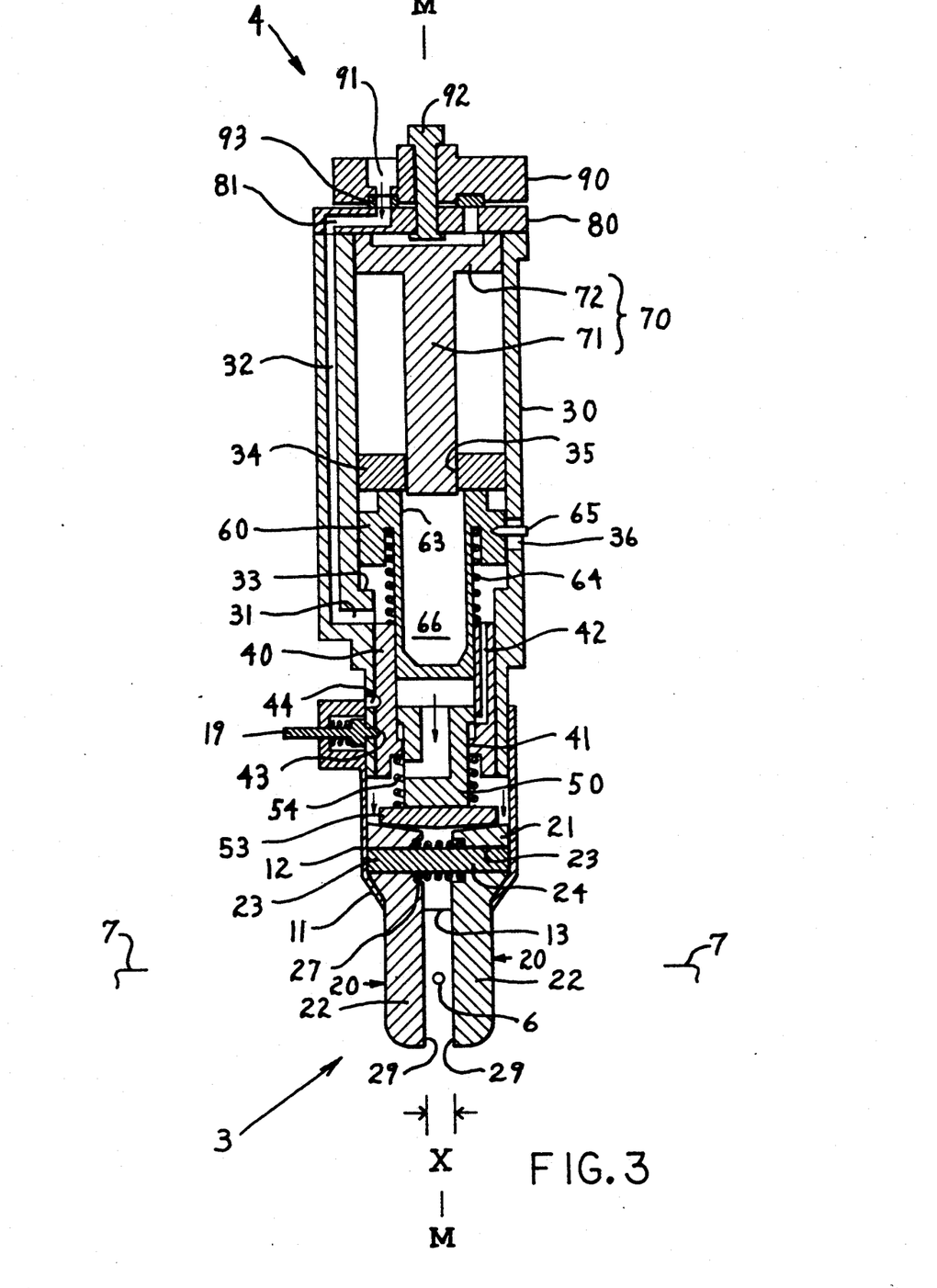
FIG. 3 is a vertical cross sectional front view showing a state where the hammer is advanced.

When the hammer 50 moves forward, the opening of the forehead portion 51 of the hammer 50 at the side of, the air communication path 55 moves downwardly beyond the annular projection 41 and moves forward so that the air in the air communication path 55 passes between the knife gauges 20, 20 and the hammer 50 and is discharged outside as illustrated in FIG. 3. Accompanied by the discharge of the air, the pressure in the air communication path 55 is reduced whereby the hammer 50 is forced backwardly by the compression spring 54 and returned to its original state.

As stated above, the hammer 50 is reciprocally moved (vibrated) in the axial direction to thereby continuously strike the knife gauges 20 and 20 by way of the patch whereby the knife gauges 20 and 20 deeply enter the gap between the metal plates 7 and 8 while they are vibrated so as to clamp the weld 6.

Figure 4:
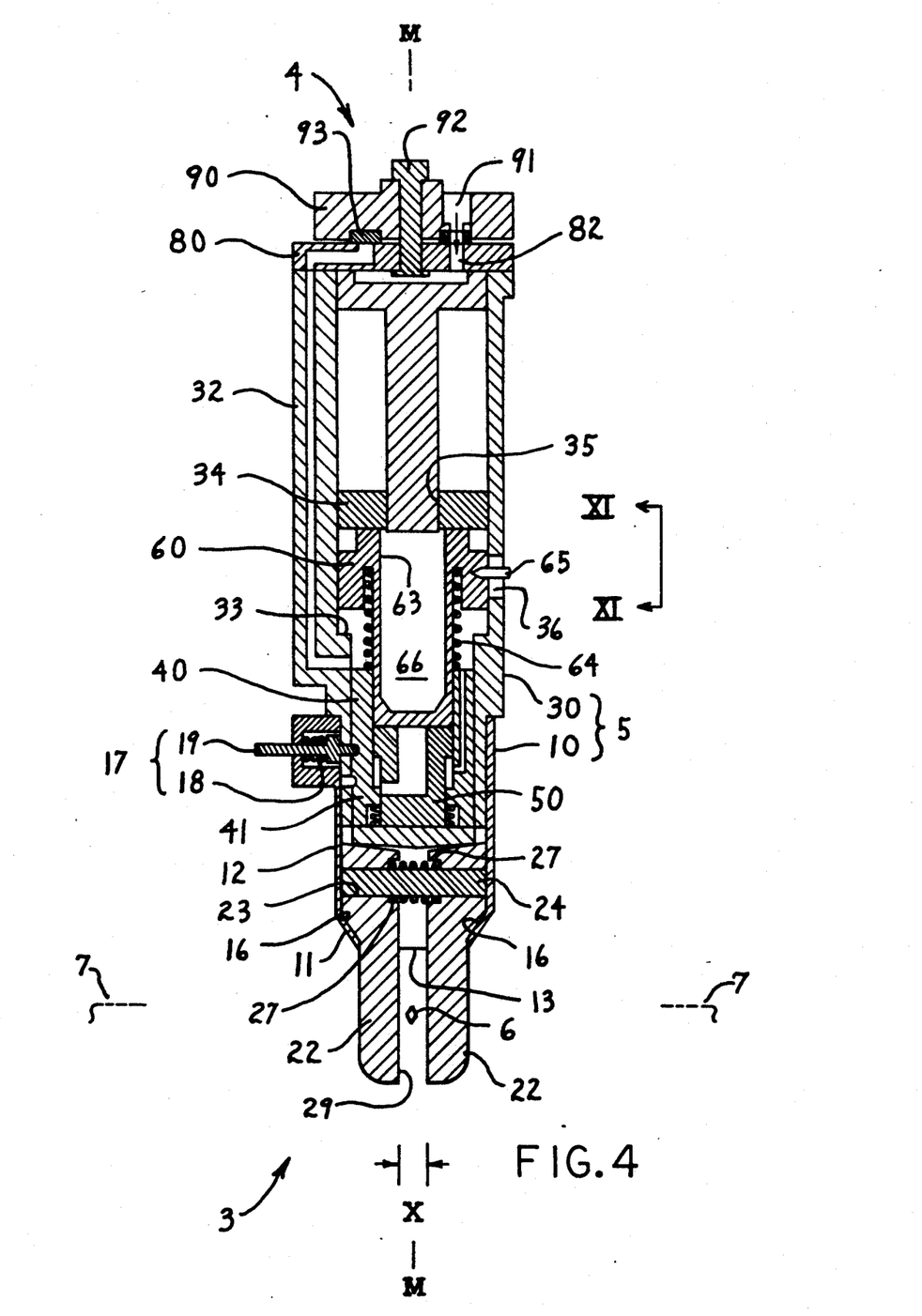
FIG. 4 is a vertical cross sectional front view showing a state where the hammer is stopped to operate before a pair of knife gauges are moved to narrow the distances therebetween.
Figure 5:
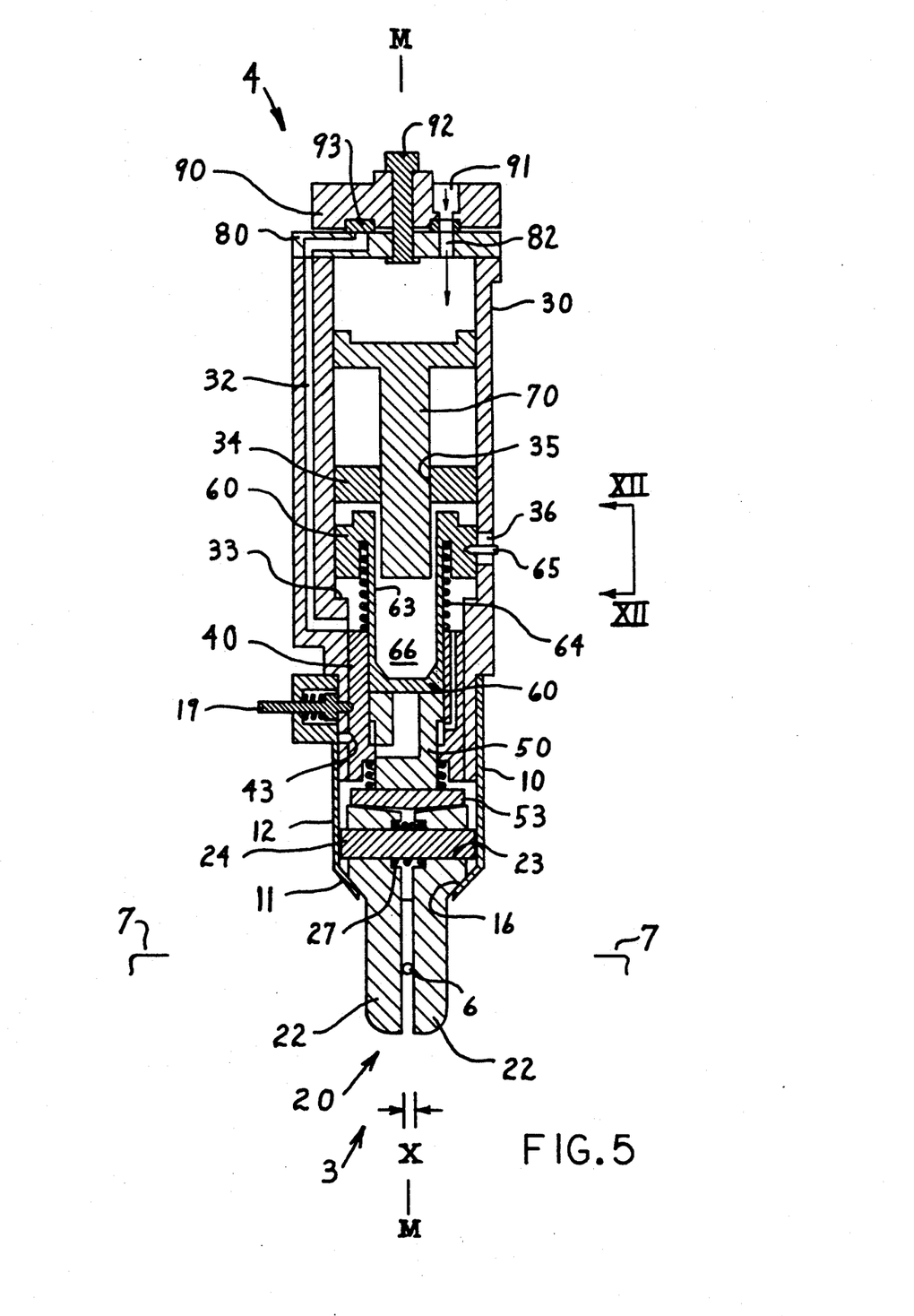
FIG. 5 is a vertical cross sectional front view showing a state where the pair of knife gauges are moved to narrow the distance therebetween.
Figure 6:
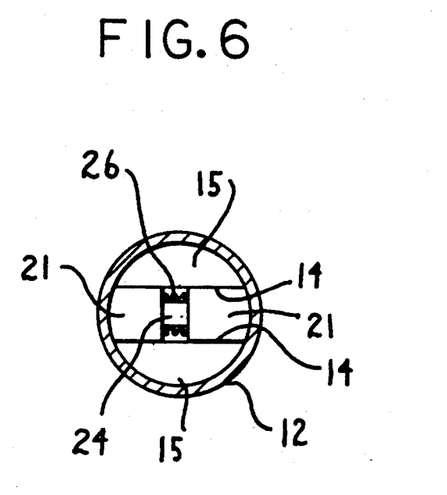
FIG. 6 is a view taken along VI—VI of a main portion as illustrated in FIG. 1.
Figure 7:
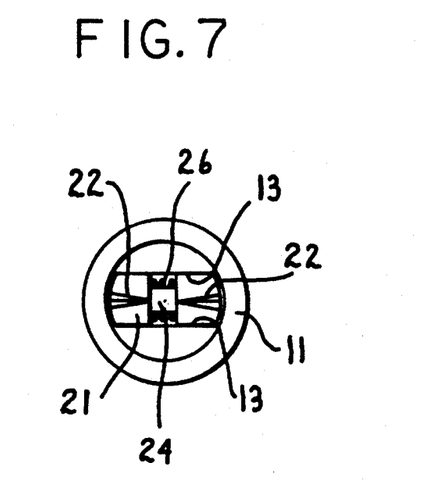
FIG. 7 is a view taken along VII—VII of a main portion as illustrated in FIG. 1.

When the knife gauges reach the position to clamp the weld 6, the pin 19 is pulled out from the pin insertion hole 43 by the pin driver 17 and the front cover 10 is deeply inserted onto the cylinder 30 as illustrated in FIG. 4. Thereafter, the pin 19 is inserted into the rear insertion hole 44 as illustrated in FIGS. 4 and 5 at the state where the hammer 50 is brought into contact with the patch 53, so that the front cover 10 is fixedly engaged on the cylinder 30.

Thirdly, when the air is supplied to the rear end surface of the piston 70 by switching the air switching rotary valve 90 to the air supply port 82 as shown in FIG. 4, the plunger 60 is pushed forward and moved. That is, the piston 70 moves and enters a bore 63 of the plunger 60 to thereby push the plunger 60 forward. The thus forwardly pushed plunger 60 pushes the knife gauges 20 and 20 forward by way of the hammer 50 and the patch 53. The thus forwardly pushed knife gauges 20 and 20 respectively move forward along the tapered surface 16 and 16 of the frustoconical front portion 11 and approach each other along the guide pin 24 so as to narrow the distance between the knife portions 22 and 22 so that they can reach the weld 6 and clamp the weld 6 with assurance. As a result, the knife gauges 20 and 20 can measure the diameter of the weld 6 and inspect the weld 6.

Upon completion of the inspection of the weld, the pin 19 is pulled out by the pin driver 17 and the front cover 10 is forced to return to the state where it is shallowly inserted onto the cylinder 30 as illustrated in FIGS. 1 and 2. Then, the pin 19 is inserted into the front insertion hole 43 so that the front cover is fixedly engaged on the cylinder 30.

Fourthly, the air switching rotary valve 90 is operated to supply the air to the air supply port 81. The air supplied to the supply port 81 is introduced into the air communication path 32 of the cylinder 30 and the air introduction port 31 so as to retract the valve case 40. At the same time, if the cylinder 30 is drawn while the compressed air is introduced into the airflow path 55 by way of the air communication path 42, the knife gauges 20 and 20 are vibrated in the same way as they are pushed so that the knife gauges 20 and 20 can be pulled out with ease. At this time, the plunger 60 is returned to its original state by the return compression spring 64.

MODIFICATIONS

Figure 9:
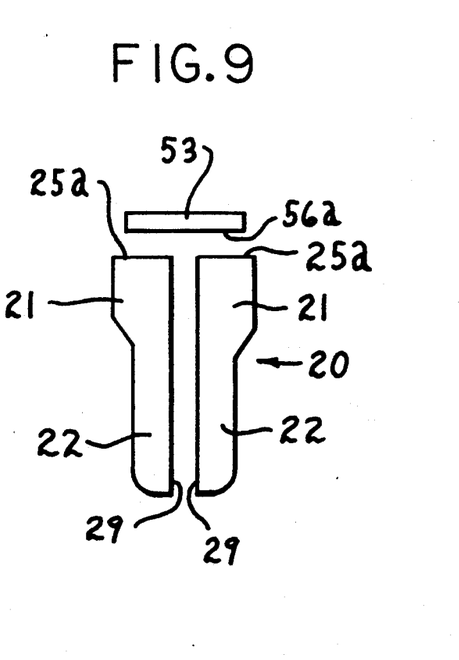
FIG. 9 is a view partly modifying the state of FIG. 1 corresponding to FIG. 8.

In a modified apparatus as illustrated in FIG. 9, the rear surfaces 25a of the boss portions 21 and the front surface 56a of the patch 53 form parallel planes.

Figure 10:
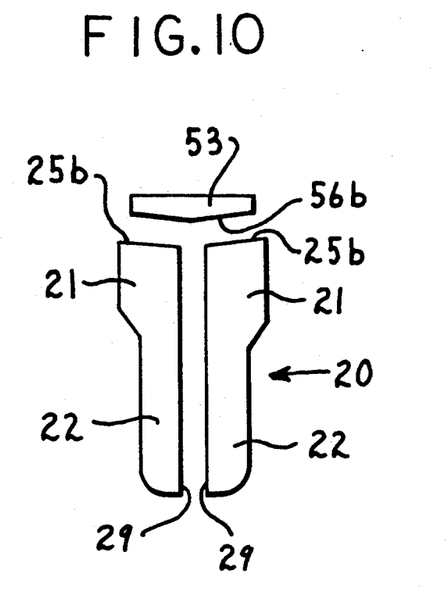
FIG. 10 is another view partly modifying the state of FIG. 1 corresponding to FIG. 8.

In a modified apparatus as illustrated in FIG. 10, the rear surfaces 25b and 25b of two boss portions 21 and 21 are inclined to form a V-shaped groove in the rearward direction at the state where they are engaged into the front cover 10. The front surface of the patch 53 is inclined so as to from a roof-shaped convex portion in the forward direction at the inclined angle conforming to the angle of the inclined surfaces 25b, 25b at the rear portion of the boss portions 21 and 21. In such a manner, when the hammer 50 and the patch 53 are pushed forward by the forwardly pushed plunger 60, the patch 53 having the roof-shaped inclined front surface pushes the V-shaped inclined rear surfaces of the boss portion 22 and 22 forwardly. As a result, moment is generated in the direction where the tip ends of the knife gauges 20 and 20 approach each other and the front surfaces of the base portions 21 and 21 smoothly slide forward along the inner inclined surface of the frustoconical front portion 11 of the front cover 10 so that the knife gauges 20 and 20 approach the axis along the guide pin 24 so as to narrow the interval therebetween and bring into contact with the weld and clamp the weld with assurance. Accordingly, it is possible to measure the diameter of the weld and inspect the weld with accuracy.

Figure 8:
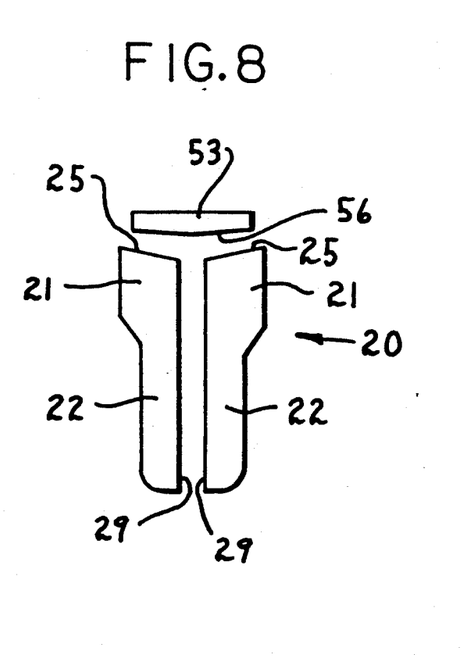
FIG. 8 is an enlarged view of a part of FIG. 1.

In the modified embodiment as illustrated in FIG. 8, the inclined angle of the rear surfaces 25, 25 or the boss portions 21,21 is slightly greater than the inclined angle of the patch 53 portion 51 so as to increase the moment of the knife gauges 20 and 20. With such an arrangement, an index 65 is provided at the side surface of the collar 62 of the plunger 60 and a long slit 36 is provided on the cylinder 30 in the axial direction at the position corresponding to the index 65. The index 65 is slidably engaged in the long slit 36.

Figure 11:
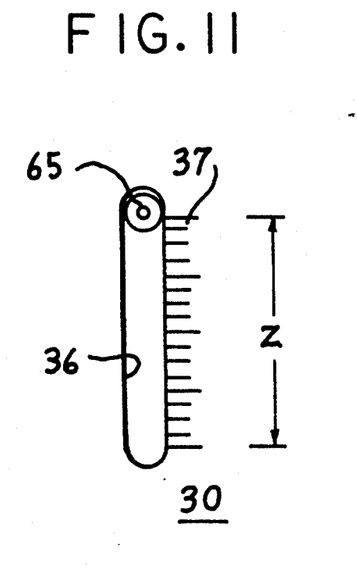
FIG. 11 is a view taken along XI—XI of a main portion which is illustrated in FIG. 4.
Figure 12:
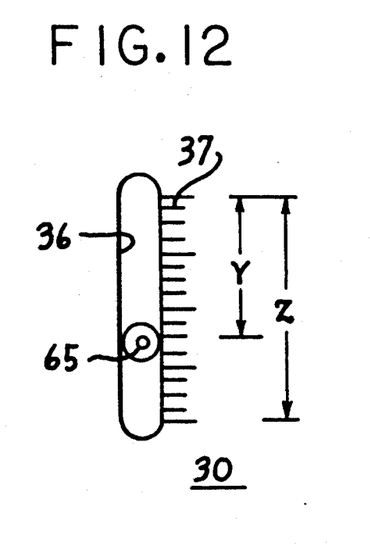
FIG. 12 is a view taken along XII—XII of a main portion which is illustrated in FIG. 5.

FIG. 11 shows a state where the knife gauges are inserted between the metal plates 7 and 8 which are shown in FIGS. 1 to 3. When the piston 70 advances, the knife gauges are positioned as illustrated in FIGS. 4 and 12. At this time, the index 65 moves relative to a gauge 37 of the cylinder 30 and the knife gauges 20 and 20 move along the tapered surfaces 16 and 16.

Assuming that Y is the amount of motion of the index 65 and Z is a constant, there is a proportional relation between (Z - Y) and the interval between both knife portions 22 and 22. That is, assuming that K is a proportional constant, the following formula is established.

$$Z - Y = K X$$

that is, this formula is tranformed as fololows.

$$Y = Z - K X$$

Accordingly, it is possible to measure the value of X by reading the value of Y.

Although the invention has been described in its preferred form with a certain degree of particularity, it is to be understood that many variations and changes are possible in the invention without departing from the scope thereof.

What is claimed is:

1. An inspection apparatus for spot welds, comprising:
    an elongated tubular casing having a central longitudinal axis, said casing comprising a cylinder and a front cover at the front end of said cylinder, said front cover having tapered internal surfaces which are disposed symmetrically with each other with respect to said central longitudinal axis;
    a pair of laterally spaced-part symmetrical knife gauges projecting frontwardly from said front cover and mounted for lateral movement toward and away from each other, said knife gauges having rear end surfaces and portions engaging said tapered surfaces for lengthwise movement therealong whereby to change the lateral spacing between said knife gauges;
    an air-operated hammer disposed inside said casing for continually applying forcible strokes to said rear end surfaces of said knife gauges;
    a valve case disposed inside said cylinder for selectively supplying air for operating said hammer; and
    a piston for applying pressure to said hammer when said valve case is not supplying air for operating said hammer.

2. An inspection apparatus according to claim 1, wherein said rear surface of said knife gauges are inclined to form a V-shaped concavity opening in a rearward direction, a patch disposed between said hammer and said rear end surfaces, said path having a front surface inclined so as to form a roof-shaped convex portion corresponding to the V-shaped concavity.

3. An inspection apparatus for spot welds, comprising:
    a pair of thin knife portions arranged in parallel with each other and adapted to be pushed into a gap between two spot-welded metal plates, clamping the weld, measuring the diameter of the weld and inspecting the rupture strength;
    a front cover composed of a frustoconical front portion which tapers in a direction toward the tip end portion thereof and a cylindrical portion axially connected to the rear end portion of said frustoconical front portion;
    said knife portions comprising boss portions disposed inside of said frustoconical front portion and having front surfaces inclined in conformity with an inclination angle of an inner surface of said frustoconical front portion of said front cover and slidably engaged therewith, said knife portions having a pair of knife gauges, said gauges having linear knife edges arranged disposed in confronting relationship and disposed symmetrically along an axis of the front cover with a compression spring being interposed therebetween, said knife portions protruding from an oblong opening of said front cover;

a cylinder adjustably connected to a rear end of said cylindrical portion of said front cover so that the length of engagement thereof can be adjusted;

a vale case having a front portion, an inner surface of which has an annular projection, said valve case having an air communication path communicating with an air introduction port provided at the side surface of the cylinder which path is opened between a rear end surface and an inner surface of the rear portion of the annular projection;

a hammer composed of a forehead portion slidably engaging with said annular projection of the valve case and a large diameter portion slidably engaging with the inner surface of the valve case behind said annular projection thereof, a path disposed between a forward end of said forehead portion of said hammer and rear surfaces of said boss portions and adapted to be brought into contact with said rear surfaces of said boss portions of said knife gauges and providing an air communication path between a side surface of said forehead portion and said rear surfaces of said knife gauges;

a plunger composed of a front cylindrical portion slidably engaging an inner surface of said valve case and adapted for pushing the hammer and a collar slidably engaging an inner surface of said cylinder, a compression spring interposed between a rear end surface of said valve case and the front end of said collar for urging said plunger in a direction away from said valve case;

a piston inserted into a rear end of said plunger for pushing the plunger into a rear portion of said cylinder to urge said plunger toward said valve case;

a rear cover having air supply ports to supply air (1) to said air communication path defined along the cylinder communicating with said air introduction port and (2) to a rear end surface of said piston; and an air switching rotary valve attached to the rear surface of said rear cover.

4. An inspection apparatus according to claim 3, wherein said rear surface of said boss portions are inclined to form a V-shaped concavity opening in a rearward direction thereof and a front surface of said patch is inclined so as to form a roof-shaped convex portion corresponding to said V-shaped concavity of said boss portions.

5. An inspection apparatus according to claim 3, wherein an index is provided at a side surface of said collar of said plunger and said cylinder has a long axial slit in a side thereof, said index being slidably engaged in said long slit.

* * * * *

UNITED STATES PATENT AND TRADEMARK OFFICE
CERTIFICATE OF CORRECTION

PATENT NO. : 5 191 720
DATED : March 9, 1993
INVENTOR(S) : Yoshimi MIURA et al It is certified that error appears in the above-identified patent and that said Letters Patent is hereby corrected as shown below:

Column 6, line 39; change "surface" to ---surfaces---.
Column 6, line 42; change "path" to ---patch---.
Column 7, line  4; change "vale" to ---valve---.
Column 8, line 16; change "surface" to ---surfaces---.

Signed and Sealed this

Twenty-eighth Day of December, 1993

*Attest:*

BRUCE LEHMAN

*Attesting Officer*   Commissioner of Patents and Trademarks